Oct. 24, 1939.  H. R. MARINI  2,176,997
INTERLAYER FOR SAFETY GLASS AND METHOD OF MAKING THE SAME
Filed July 28, 1936
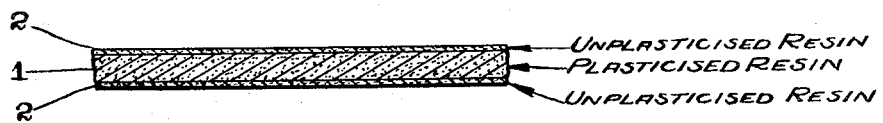
INVENTOR.
HERMAN R. MARINI.
BY Bradley + Bee
ATTORNEYS.

Patented Oct. 24, 1939

2,176,997

UNITED STATES PATENT OFFICE 2,176,997

INTERLAYER FOR SAFETY GLASS AND METHOD OF MAKING THE SAME

Herman R. Marini, New Kensington, Pa., assignor to Pittsburgh Plate Glass Company, Allegheny County, Pa., a corporation of Pennsylvania Application July 28, 1936, Serial No. 93,002

8 Claims. (Cl. 49—81)

The invention relates to the sheets for use as reinforcing in the manufacture of safety glass. Certain types of plastic used for this purpose, such as the synthetic resins, contain a large amount of plasticizer and are adhered to the glass sheets without the use of cement by the application of heat and pressure to the assembly, the interlayer developing a high degree of adhesive power upon the application of the heat in the pressing operation. Plastic sheets of this kind have a tendency to stick together at room temperature when stacked and are difficult to match in the step of assembling the glass and plastic sheets, since they will not slide readily one upon the other. The present invention has for its objects the provision of an improved interlayer and method of producing the same which will overcome the difficulty as to the sheets sticking together and as to matching. This is accomplished by treating the surfaces of the sheets so that they are no longer tacky or adherent at room temperatures and so that they will slide freely upon the glass sheets. This treatment is further of such a character that it does not lessen the property of the sheets to adhere to the glass when subject to heat and pressure. The sheet, as produced by the process, is illustrated in the accompanying drawing, wherein:

The figure is a section through the sheet, the layers of material as shown being much exaggerated in thickness for clearness of illustration.

In the drawing, 1 is the body of the sheet or interlayer, and 2, 2 are thin layers covering the sides of the sheet. The body 1 of the sheet in its preferred form is a synthetic resin containing an amount of plasticizer such that the sheets will stick together if stacked at ordinary room temperatures, and will resist sliding movement over sheets of glass in matching. Such sheets may not have any appreciable feeling of stickiness or tackiness, but nevertheless will have the objectionable characteristics above mentioned, and will become firmly stuck together if left in a pack for any length of time. The layers 2, 2 are preferably, although not necessarily, of the same resin composition as the body 1, but differ therefrom in that they are substantially free from plasticizer. The surfaces of the sheets, therefore, lack the tendency toward adherence, and properly coated sheets may be stacked indefinitely without adherence. The surfaces are also relatively free from resistance to sliding on glass, so that in matching, they offer practically no more resistance to movement between glass sheets in making the assemblies preliminary to laminating, than is the case with cellulose nitrate or cellulose acetate sheets.

The layers 2, 2 are very thin, merely films, which are applied by dissolving the resin in a low boiling solvent and then spraying the sides of the sheets. This can be done very quickly and cheaply, as the sheets pass along on a conveyor, and the thickness of the film is so slight, that they become dry to touch and sight in a few minutes. The labor and material cost incident to the treatment is, therefore, very small. When the sheets are assembled with glass sheets, and pressed in the usual way with the application of heat, the plasticizer in the body of the sheet immediately permeates the surface films, so that the coated sheets adhere to the glass with the same tenacity as uncoated resin sheets, and with no change in the technique of pressing. The coated sheets present a further important advantage over the ordinary resin sheets, in that the tendency to entrap air between the plastic and glass sheets is avoided, this being due to the fact that the unplasticized surfaces are harder and smoother than plasticized surfaces, and do not adhere to the glass in such manner as to prevent the air from escaping laterally between the surfaces of the sheets of resin and glass during the application of pressure to the assembly. As a result the number of rejects incident to air bubbles in the finished product is reduced to a fraction of the number of rejects when the sheets are not coated.

The process is applicable to any synthetic resin, or other plastic containing a plasticizer in quantity, such that sticking occurs in stacking, but as a specific example, the one set forth in the patent to E. L. Fix, No. 2,045,130, dated June 23, 1936, may be cited. Such resin is a polymerized incomplete poly-vinyl acetal resin containing as a plasticizer about 30 per cent of glycol dihexoate. In order to prepare the coating material, this resin in unplasticized condition, is mixed with low boiling solvents as set forth in the following examples:

(1)

| | Percent |
|---|---|
| Vinyl acetal resin | 3 |
| Methanol | 97 |

(2)

| | |
|---|---|
| Vinyl acetal resin | 2 |
| Ethyl alcohol | 98 |

| | |
|---|---|
| (3) | |
| Vinyl acetal resin | 3 |
| Methanol | 72 |
| Ethylene dichloride | 25 |

The foregoing mixtures are applied to the surfaces of the plasticized resin sheets by air pressure spraying devices in the same manner that a gelatin film is applied as an adhesive in preparing cellulose nitrate sheets for lamination, the film, after drying being less than one thousandth of an inch in thickness. It might be expected that these films would immediately absorb plasticizer from the body of the sheet, and so become ineffective to accomplish the desired result, but this has been found not to be the case as no appreciable absorption of plasticizer occurs at the temperatures encountered before the assembly is placed in the autoclave for pressing, at which time a temperature upwards of 200 degrees F. is applied to secure adhesion between the glass and plastic resin.

What I claim is:

1. An interlayer for use in laminated glass comprising a sheet of organic plastic containing sufficient plasticizer therein to make the sheet tacky, having its surfaces coated with a thin layer of a similar organic plastic in which the plasticizer content is so small that said layer will be non-tacky, said layer being adapted to form at least a part of the adhesive bonding said interlayer to glass.

2. An interlayer for use in laminated glass comprising a sheet of organic plastic containing sufficient plasticizer therein to make the sheet self-adhesive, having its surfaces coated with a thin, non-self-adhesive layer of a similar organic plastic containing no plasticizer, said layer being adapted to form at least a part of the adhesive bonding said interlayer to glass.

3. An interlayer for use in laminated glass comprising a sheet of polyvinyl acetal resin plastic containing sufficient plasticizer therein to make the sheet tacky, having its surfaces coated with a thin layer of a similar polyvinyl acetal resin plastic in which the plasticizer content is so small that said layer will be non-tacky, said layer being adapted to form at least a part of the adhesive bonding said interlayer to glass.

4. In the manufacture of laminated glass, the steps comprising coating the surface of an interlayer sheet of organic plastic containing sufficient plasticizer therein to make the sheet tacky, with a thin layer of a similar organic plastic in which the plasticizer content is so small that said layer will be non-tacky, and thereafter bonding said interlayer sheet to glass without removing said layer.

5. In the manufacture of laminated glass, the steps comprising coating the surface of an interlayer sheet of organic plastic containing sufficient plasticizer therein to make the sheet self-adhesive, with a thin layer of a similar organic plastic containing no plasticizer, and thereafter bonding said interlayer sheet to glass without removing said layer.

6. In the manufacture of laminated glass, the steps comprising coating the surface of an interlayer sheet of polyvinyl acetal resin plastic containing sufficient plasticizer therein to make the sheet tacky, with a thin layer of a similar polyvinyl acetal resin plastic in which the plasticizer content is so small that said layer will be non-tacky, and thereafter bonding said interlayer sheet to glass without removing said layer.

7. In a composite interlayer for cementing together plates of laminated glass, a plasticizer-containing plastic sheet of tacky quality individually capable of adhering to like plastic sheets, and a non-tacky synthetic resin in layer form bonded to the tacky plastic sheet rendering the combined sheet and layer normally non-adherent to an interlayer of like construction and said combined sheet and layer being responsive to heat and pressure between plates of glass to form a bonding medium therebetween.

8. In a method of manufacturing laminated glass, the steps of bonding a layer of non-tacky synthetic resin to a tacky plasticizer-containing plastic sheet to render the combined sheet and layer unit normally non-adherent to a like combined sheet and layer unit, and thereafter bonding the combined sheet and layer unit to glass without removing the non-tacky layer.

HERMAN R. MARINI.